July 14, 1970   F. C. GAINES, JR   3,520,244
SUSPENSION FOR CONVECTION TUBE
Filed May 31, 1968
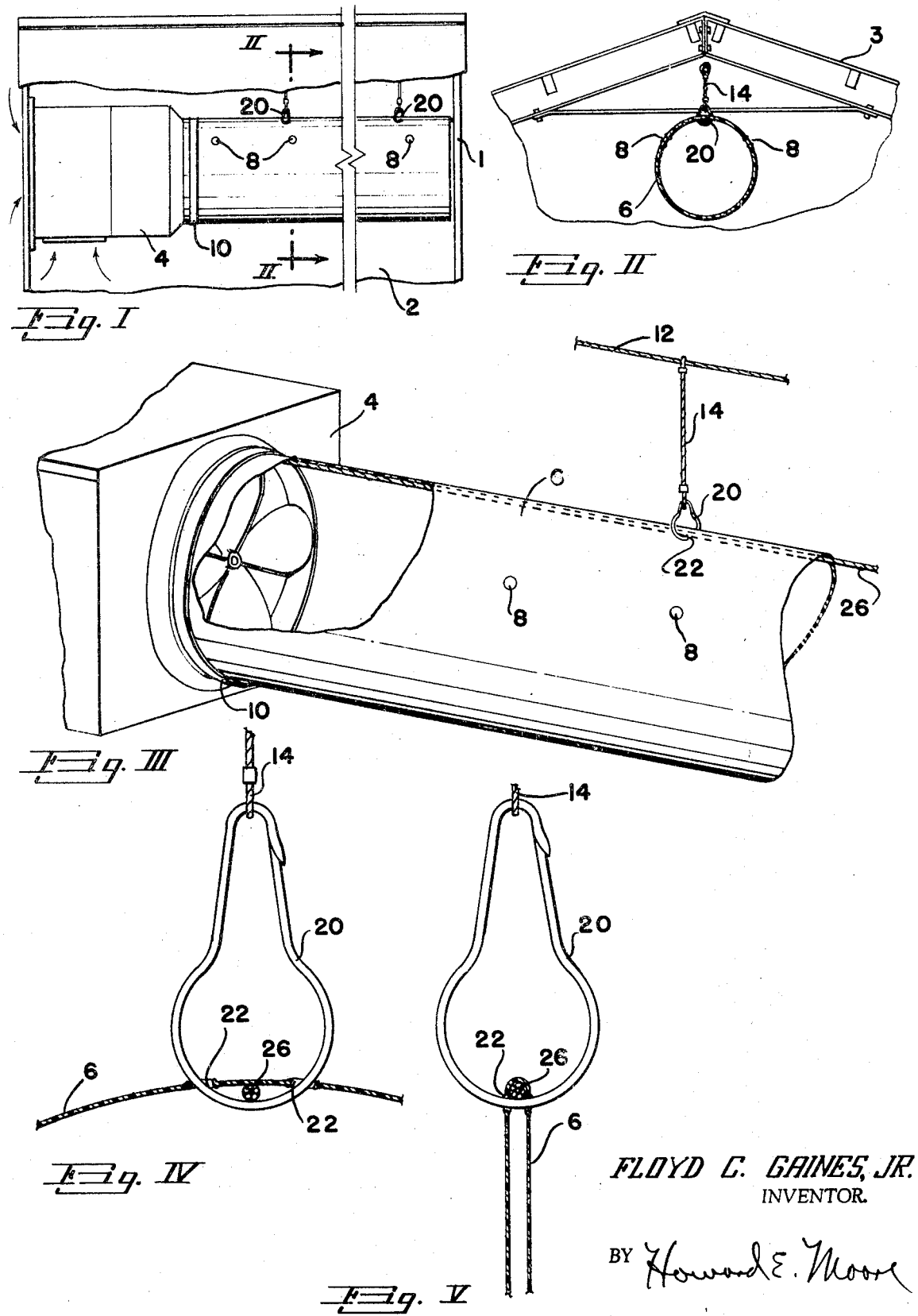
FLOYD C. GAINES, JR.
INVENTOR.
BY Howard E. Moore
ATTORNEY

United States Patent Office 3,520,244
Patented July 14, 1970

---

3,520,244
SUSPENSION FOR CONVECTION TUBE
Floyd C. Gaines, Jr., Grapevine, Tex., assignor to Pan American Hydroponics, Inc., Grapevine, Tex., a corporation of Texas
Filed May 31, 1968, Ser. No. 733,402
Int. Cl. F24f 7/00; F16l 3/00
U.S. Cl. 98—40                                   6 Claims

ABSTRACT OF THE DISCLOSURE

A suspension system for polyethylene convection tubes used in greenhouses and other buildings consisting of a wire support connected to a hanger hook for supporting a nylon or other type of cord which extends throughout the length of the polyethylene convection tube to distribute the forces upon the convection tube to prevent tearing thereof.

BACKGROUND OF THE INVENTION

Greenhouses are designed to furnish a controlled environment to the plants with a minimum of maintenance problems and the least amount of manual labor consistent with economic problems of the installation. Proper air circulation and ventilation must be maintained at all times. High temperatures at any time, and especially during conditions of low light, will cause plants to become spindly and weak. Low temperatures will reduce growth and delay plant development, and may also cause rough fruit in tomatoes. Therefore uniform temperatures are essential for adequate control of mature plant development and production of uniformly sized transplants or seedlings.

Daytime temperatures and humidity are primarily controlled ventilation. This air exchange supplies carbon dioxide, which is used in photosynthesis, and helps to minimize disease problems. Ventillation at night except during excessively cold periods insures adequate air circulation and reduced humidity.

While ventillation is required, cold drafts which may be harmful to the plants must be avoided. Drawing air from the outside of the building through overhead polyethylene convection tubes or sleeves that extend the length of the building is one solution. Holes are placed in the tubes at regular intervals and oriented horizontally to maintain an even but gentle circulation of air.

When proper ventillation is provided stagnant air pockets are reduced and a uniform temperature is maintained with more precise control of the temperature at the plant level. This reduces the heat requirement, facilitates fruit setting, lowers the relative humidity and consequently the incidence of foliage diseases, especially gray mold, leaf mold and botrytis.

Air movement through plant foliage will also reduce the gas diffusion resistance near leaf surfaces. Whether the atmosphere of the greenhouse is carbon dioxide enriched or not, greenhouse crops benefit from proper ventilation because higher effective carbon dioxide levels are maintained at the leaf surfaces.

Proper ventilation for daytime cooling in summer requires that fans be utilized which are capable of recirculating the entire volume of the air in the greenhouse every minute. Daytime winter cooling, nighttime cooling and humidity control require about one change every two minutes. While a large volume of air is required, excessive turbulence must be eliminated. Experimentation has revealed that a convection tube approximately 24 to 30 inches in diameter with spaced perforations through which the air can escape over the length of the greenhouse is a very effective arrangement for delivering and recirculating the large volume of air required, while eliminating turbulence. The convection tube should be of a clear plastic or polyethylene material which is transparent and of high strength to withstand the air pressure while eliminating shadows within the greenhouse. The function of this tube is to distribute the incoming air uniformly throughout the house and to uniformly recirculate same to prevent formation of stagnant air pockets. While such a perforated plastic tube or sleeve arrangement for distributing the air has proven effective, difficulty is being encountered in providing a suspension system for supporting the convection tube. Failure of the suspension system results in plant damage by breaking and crushing plants if the system should fall to the ground, results in overheating or excessive cold and greatly reduces the absorption of carbon dioxide to the plant leaves.

Previous suspension systems have employed attachment, and suspension at spaced intervals along the tube, placing undue stress at localized points, thus causing breaking, tearing and loss of support of the tube at such points, resulting in lessening or loss of circulation.

A failure or malfunctioning of the ventilation system for only a short period of time may result in permanent damage to the plants.

SUMMARY OF THE INVENTION

The present invention incorporates a suspension system for convection tubes made of polyethylene or other plastic material which is easily torn. The invention utilizes a detachable hook suspended to a wire or cable. The hook is attached to the convection tube and utilizes a reinforcing such as a nylon cord passing through the tube for distributing the weight of convection tube and reducing stress and tearing forces at points of suspension of the convection tube.

The primary object of the present invention is to provide suspension means of durable construction which will minimize the possibility of failure of the ventilation system of the greenhouse thereby protecting the controlled atmosphere resulting in maximum production of the plants.

A further object of the invention is to provide a suspension system which incorporates structural strength which is economically feasible for use in greenhouses and other buildings and distributes the support throughout the length of the tube.

A further object of the present invention is to provide a suspension system which may be installed by unskilled labor.

A further object of the present invention is to provide a suspension system for convection tubes which may be replaced quickly and economically to modify the greenhouse ventilation system to meet varied requirements of different plants.

A further object of the invention is to provide a suspension system for convection tubes wherein the weight is distributed and is not supported at localized areas, thereby preventing breakage and tearing of the tube.

Other and further objects of the present invention will become apparent upon reading the following specifications, drawings and claims.

DESCRIPTION OF THE DRAWING

The accompanying drawings of the present invention are provided so that the invention may be better and more fully understood, in which:

FIG. I is a fragmentary cross-sectional view of the greenhouse showing the location of the convection tube therein, FIG. II is a cross-sectional view taken substantially along lines II—II of FIG. I, FIG. III is an enlarged perspective view of a section of the convection tube showing the suspension system, FIG. IV is an enlarged cross-sectional view of the convection tube when fully inflated, FIG. V is a cross-sectional view of the convection tube and suspension system when a convection tube is deflated.

Numeral references are employed to indicate the various parts shown in the drawings, and like numerals indicate like parts throughout the various figures of the drawing.

DESCRIPTION OF A PREFERRED EMBODIMENT

Referring to FIG. I of the drawings, numeral 1 represents the end walls connected by side walls 2 of the greenhouse which support a roof 3 forming an enclosure for a controlled atmosphere. The output of a fan 4 is delivered by a convection tube 6 to selected parts of the greenhouse. The intake of fan 4 may be alternately connected by louvers to the outside of the greenhouse or to the atmosphere inside the greenhouse to recirculate the air.

The convection tube 6 is preferably constructed of clear transparent polyethylene plastic material and is perforated at predetermined locations throughout the length thereof forming outlet vents 8 for dispersing the flow of air throughout the greenhouse resulting in a substantial reduction of turbulence.

The outlet vents 8 may be spaced according to any desired pattern for establishing ideal atmospheric conditions for any selected crop. The outlet vents 8 may be spaced or of varying size to assure uniform dispersal of the air throughout the length of the tube. This could be done by providing small holes at the end of the tube near the fan and progressively larger holes throughout the length of the tube which would be evenly spaced, or vents 8 could be of progressively larger diameter throughout the length of the tube from the fan out to compensate for loss of velocity from friction throughout the length of the convection tube 6.

The convection tube may be connected to the fan by suitable means such as a clamp 10 secured about a flange on the fan housing 4.

Particular attention is called to the supporting means for the tube 6 consisting of an upper support 12 which may be a wire, or a rigid bar or a part of the building, and intermediate support 14 of any suitable material such as wire or cord, connected to the upper support member 12 by any suitable means such as a slip ring or tie and connected at the lower end thereof by a second slip ring or tie to a hanger hook 20 which is connected to convection tube 6 as hereinafter described.

As best seen in FIGS. IV and V the hanger hook 20 passes through the walls of the convection tube through openings 22, encircling the tube support line 26. Hanger hook 20 is of the spring pin type operable by pressing inwardly of the legs. Tube support line 26 passes longitudinally through the convection tube 6 and is attached to the end walls of the greenhouse. The tube support line 26 may be of any material. However it is desirable that the line be of nylon or other stranded plastic material which is very soft and extremely strong and of sufficient diameter to provide a substantial bearing surface between the tube support line and the convection tube 6 to eliminate stress upon the convection tube 6 and prevent cutting thereof by the tube support line 26.

The purpose of the tube support line 26 is to distribute the load throughout the length of the convection tube thereby eliminating concentrated forces upon the surface of the convection tube and the points of attachment of the hanger hooks 20. The load is evenly distributed both when the tube 26 is extended and when it is collapsed. It will be noted that hanger hook 20 does not engage the tube 6 but engages the line 26, which in turn uniformly engages the tube 26 throughout its length.

Holes 22 and outlet vents 8 are preferably formed by burning, since polyethylene and plastic materials form a small reinforcing bead around a hole burned in the material.

The suspension system disclosed herein is a significant improvement over tube hangers heretofore developed consisting of much more elaborate means intended to distribute stress at points of attachment of the suspension system to the convection tube yet failed to do so. Devices heretofore employed have consisted of attachment of adhesve material over a small portion of the convection tube attempting to distribute the stress thereover. This device has been impractical because the adhesive material tends to loosen and become detached after a period of time.

Another device which has proved ineffective consisted of a clip which was attached to the outside of the convection tube by forcing a short bar or clip into the outer clip to distribute the stress. However the rigidity of the clips resulted in concentrated stress around surfaces of the hanger devices tending to tear the material, causing the convection tube to fall and therefore become inoperable or unevenly distribute the circulated air. The device disclosed herein incorporates inexpensive material which may be installed very easily and quickly merely by placing tube support line 26 throughout the length of the convection tube, securing it at each end of the greenhouse, and attaching hanger hooks 20 thereto. It will be noted that the hanger hooks 20 may be positioned at any convenient location along the tube to facilitate convenience of installing the convection tube. Devices heretofore developed have required placing clips or adhesive material at spaced locations throughout the length of the tube, requiring substantial time and expense for the installation thereof, yet securing a very insecure suspension system.

The embodiment of the invention described herein offers numerous distinct improvements over devices developed heretofore.

Thus it will be seen that I have provided a convection tube suspension system wherein the weight of the tube is uniformly distributed throughout its length thereof, which eliminates suspension stress at localized areas, thereby eliminating tearing and failure of the material at such localized areas, which is inexpensive and easy to install.

It will be understood that other and further embodiments of my invention may be made without departing from the spirit and scope of appended claims.

Having described my invention, I claim:

1. In a ventilating and circulating system including a louver assembly mounted within a wall of a building and a fan having an intake with a louver arrangement for providing a fluid coupling with the atmosphere outside the building or with the atmosphere inside the building for bringing in fresh air and recirculating the air therein, the combination with said louver assembly and said fan of a non-rigid convection tube assembly connected to the discharge of said fan, said tube assembly including a plurality of spaced openings in the wall thereof of predetermined size and spaced along the length thereof, means for uniformly suspending the tube along the entire length thereof from a portion of the building, including a support line positioned inside the convection tube extending longitudinally therethrough and secured at each end of the building, spaced hanger hooks passing through the wall of the tube and about the line, and means for suspending the hanger hooks to the building.

2. The combination called for in claim 1 wherein the means for suspending the hanger hooks to the building comprises a line extending longitudinally of the building and suspending members attached between the line and the hooks.

3. A suspension system for a non-rigid convection tube used in a building comprising, a tube support line extending longitudinally through the tube and attached at each end to the building, hooks passing through passages in the wall of the tube and extending about the line, and means for suspending the hooks from a portion of a building.

4. A suspension system for a non-rigid convection tube in a building comprising, an upper support member, a plurality of intermediate support members suspended to the upper support member, spaced hanger hooks attached to each intermediate support member, a tube support line disposed inside of the convection tube and supported at each end to the buildings, pairs of spaced passages in the wall of the convection tube through which the legs of the hanger hooks may pass, the said hanger hook being passed through the holes to encircle the tube support line.

5. The combination called for in claim 4 wherein the line is of such size and the holes are so spaced apart that the hanger hooks will engage the line both when the tube is extended and collapsed.

6. The combination called for in claim 4 wherein the hanger hooks, are made of spring-like material and having a leg therein which may be sprung inwardly out of engagement with the body thereof to open same.

References Cited

UNITED STATES PATENTS

| | | | |
|---|---|---|---|
| 2,222,497 | 11/1940 | Bins | 138—107 |
| 3,357,088 | 12/1967 | Hoffman et al. | 138—107 XR |

LAVERNE D. GEIGER, Primary Examiner

R. J. SHER, Assistant Examiner

U.S. Cl. X.R.

138—107